Aug. 16, 1932.　　　W. H. CARRIER　　　1,871,662
METHOD AND MEANS FOR LUBRICATING COMPRESSORS AND THE LIKE
Filed March 22, 1929　　3 Sheets-Sheet 1

INVENTOR.
Willis H. Carrier
By Parker & Brochures.
ATTORNEYS.

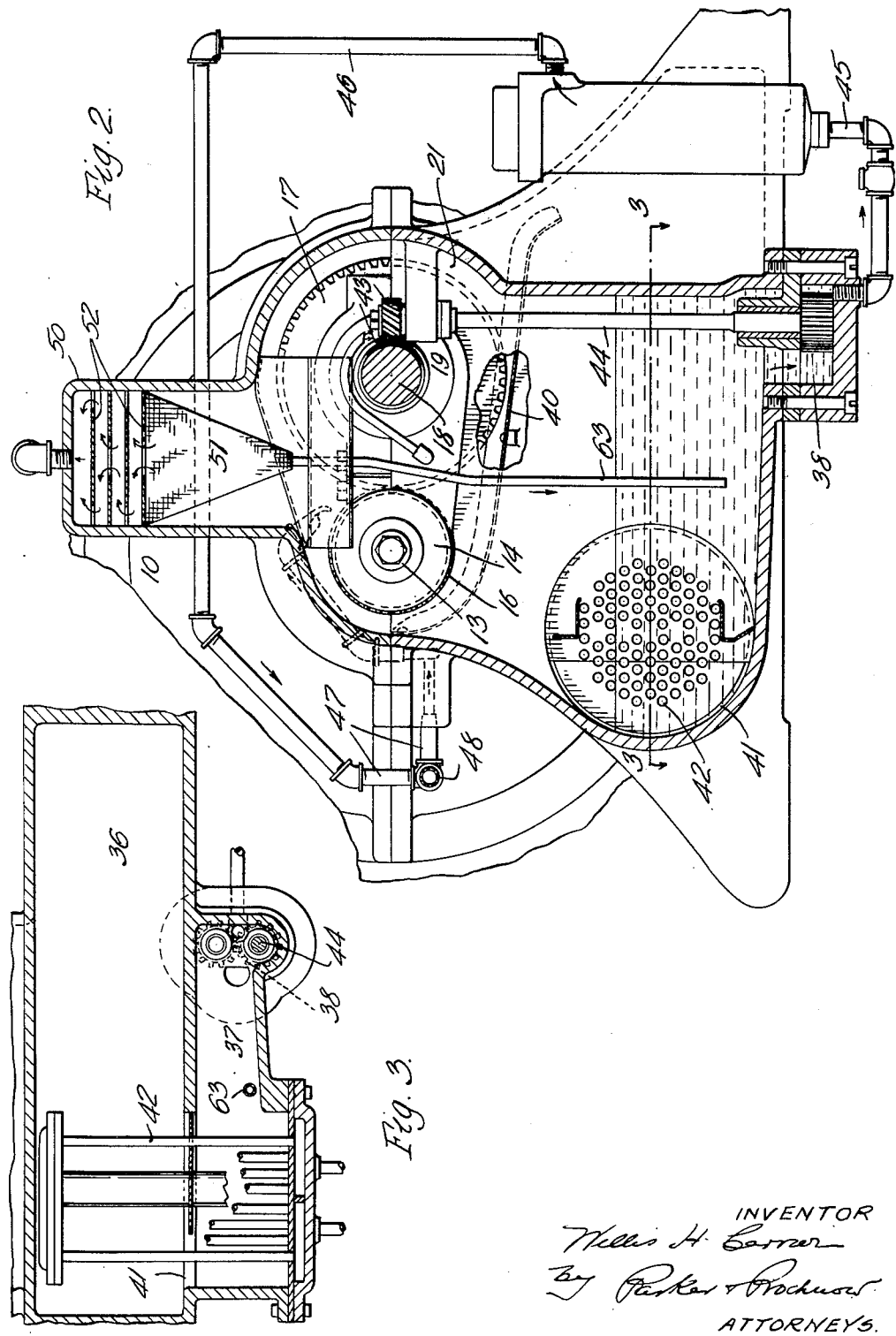

Aug. 16, 1932.  W. H. CARRIER  1,871,662
METHOD AND MEANS FOR LUBRICATING COMPRESSORS AND THE LIKE
Filed March 22, 1929  3 Sheets-Sheet 3

INVENTOR.
Willis H. Carrier
By Parker & Brockwood
ATTORNEYS.

Patented Aug. 16, 1932

1,871,662

UNITED STATES PATENT OFFICE

WILLIS H. CARRIER, OF ESSEX FELLS, NEW JERSEY, ASSIGNOR TO CARRIER ENGINEERING CORPORATION, OF NEWARK, NEW JERSEY

METHOD AND MEANS FOR LUBRICATING COMPRESSORS AND THE LIKE

Application filed March 22, 1929. Serial No. 349,252.

This invention relates to methods and means for lubricating vacuum pumps or elastic fluid compressors, for cooling and rectifying or purifying the lubricants used for lubricating the compressors, and for preventing the fluid which is being compressed from being contaminated by the lubricant, or vice versa.

Among other uses, the invention is applicable to centrifugal compressors used in refrigerating apparatus for compressing the vapors of volatile liquid refrigerants, such for example as dichloroethylene, ethyl chloride, methyl chloride and other hydrocarbon derivatives. In such applications it is important to reduce to the minimum the absorption of the refrigerant vapor by the lubricant used for the bearings, drive gearing or other parts of the compressor, and to remove the refrigerant vapor from the lubricant so as to maintain the lubricating efficiency of the latter. On the other hand it is important to prevent the contamination or dilution of the refrigerant by the lubricant, which would lower the efficiency of the refrigerant.

One object of my invention is to provide a practical and efficient method and means for accomplishing the above mentioned results.

Another object is to minimize the vaporization or foaming of the lubricant for the bearings, drive gearing or other working parts of the compressor and prevent the lubricant or foam from getting into the compressor and lowering the efficiency of the refrigerant or fluid being compressed.

Other objects of the invention are to provide an enclosure or lubricating chamber for the bearings, drive gearing or other parts of the compressor requiring lubrication and prevent leakage of the lubricant from the enclosure into the compressor; also to separate from the lubricant, any of the refrigerant vapor or fluid being compressed which may leak from the compressor into the lubricating chamber, and preferably to return the separated vapor or fluid to the compressor; and also to improve methods and means for cooling and rectifying the lubricants for compressors and preventing leakage of the lubricant into the interior of the compressor in the other respects hereinafter described and set forth in the claims.

In the accompanying drawings:

Fig. 2 is a transverse, sectional elevation thereof, on line 2—2, Fig. 1.

Fig. 3 is a fragmentary, sectional plan thereof on line 3—3, Fig. 2.

Figure 1:
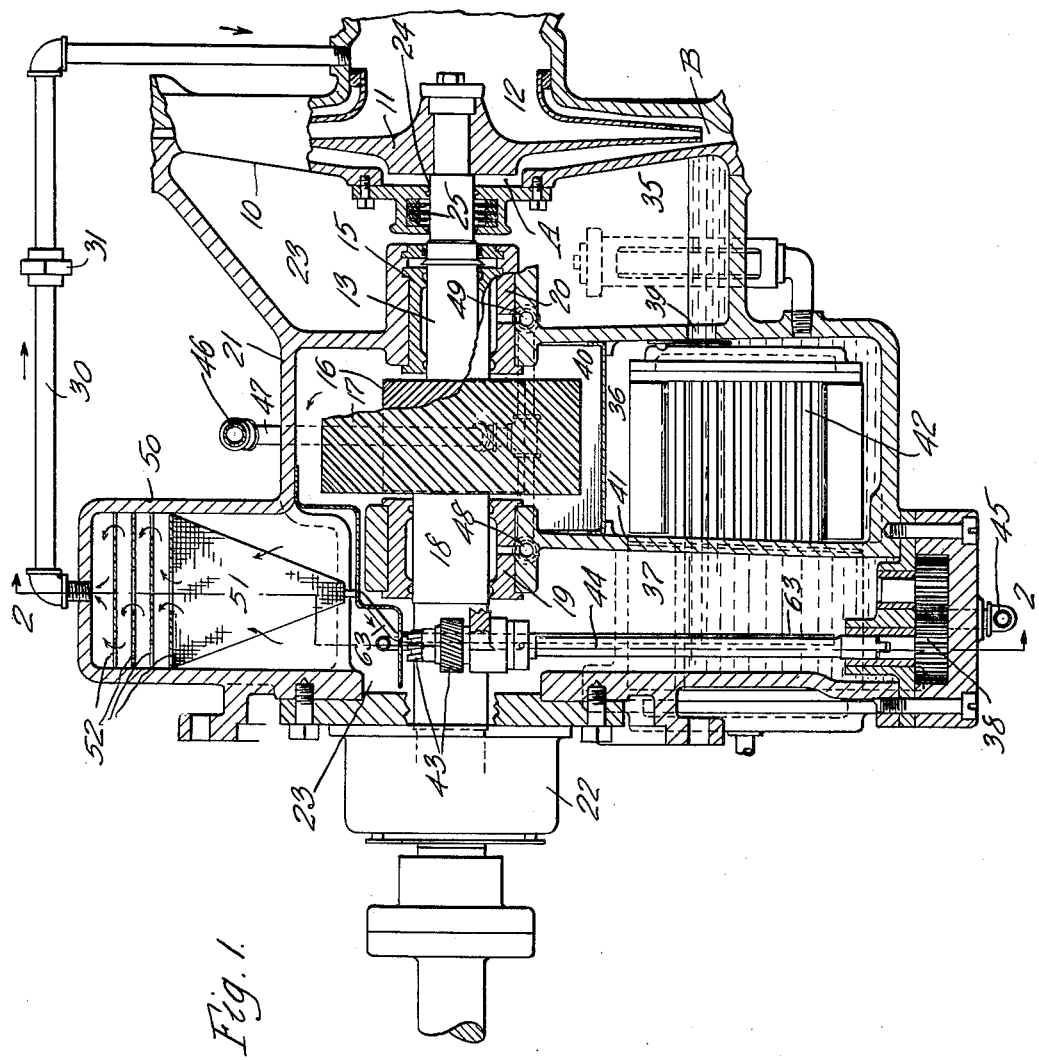
Fig. 1 is a longitudinal, sectional elevation of a compressor provided with means embodying my invention for cooling and rectifying the lubricant for the compressor.

Referring first to Figs. 1 to 3, 10 represents the casing of a centrifugal fluid compressor or vacuum pump, 11 the rotor thereof, 12 the rotor chamber or chamber in the compressor casing in which the rotor revolves, and 13 the rotor shaft by which the rotor is rotated. In the two embodiments of the invention shown in the drawings, the compressor is of the single stage, overhung type in which the rotor shaft extends out of the pressure end of the rotor chamber, that is that end thereof opposite from the suction or inlet end, and in which the internal pressure is greater than the suction or inlet pressure. As shown in Figs. 1 and 2, the rotor shaft 13 is journalled in suitable bearings 14 and 15 and is geared by intermeshing gear wheels 16 and 17 to a low speed drive shaft 18 journalled in suitable bearings 19 and 20. The bearings and drive gearing are enclosed within a housing 21 of any suitable construction adapted to effectually enclose the drive gearings and bearings and from which the drive shaft 18 extends through a suitable seal or stuffing box 22 for connection to the driving motor or device. The housing 21 may be formed with or connected to the compressor casing in any suitable manner providing gas tight joints between the housing 21 and the compressor casing.

The interior or lubricating chamber 23 of the housing 21 communicates with the interior or rotor chamber of the compressor by the shaft opening 24 through which the rotor shaft extends from the rotor chamber into the lubricating chamber 23. A labyrinth or other suitable seal or stuffing box 25 is provided for minimizing the leakage around the rotor shaft through the shaft opening 24 into or out of the rotor chamber.

The pressure in the pressure end of the rotor chamber in or near the region designated A, where the shaft opening 24 communicates with the rotor chamber, is higher than the suction or inlet pressure of the compressor and lower than the discharge pressure of the rotor in the region marked B, Fig. 1, the pressure at A being, for instance, about three eighths of the discharge pressure at B.

The leakage between the portion A of the rotor chamber and the chamber 23 through the shaft opening 24 tends to equalize the pressures in these chambers, and if there were no outlet for pressure from the chamber 23, equilibrium would be established. Under such circumstances, during periods when the oil in the lubricating chamber 23 is cold, the gas would leak from the compressor into the chamber 23 and would be absorbed by the oil, thus thinning it possibly to the detriment of lubrication. When on the other hand, the oil becomes warm in the lubricating chamber, there would be a counterflow of gas from the chamber 23 into the rotor chamber of the compressor which would be likely to carry oil, or oil foam or vapor with it into the compressor so as to contaminate or dilute the fluid being compressed, and in the case of refrigerating apparatus, thus lowering the refrigerating efficiency.

In order to prevent leakage from the lubricating chamber 23 through the shaft opening 24 into the compressor, provision is made to maintain a lower pressure in the chamber 23 or at the outer end of the shaft opening 24 than in the portion A of the rotor chamber, or within the shaft opening between its inner and outer ends. For this purpose, in the construction shown in Figs. 1 to 3, the chamber 23 or interior of the housing 21 is connected by a suitable pipe or passage 30 with a low pressure portion of the interior of the compressor, for instance, with the suction end of the compressor. This pipe or passage may be provided with a restriction 31, and by making this restriction of appropriate area, a pressure may be maintained in the lubricant chamber 23 at any desired value from that corresponding to the pressure at A in the rotor chamber to that corresponding substantially to the suction pressure. By thus maintaining a pressure in the chamber 23 always lower than the pressure at A in the compressor, any leakage through the shaft opening will always be outwardly, that is from the compressor to the lubricating chamber 23, thus preventing oil from following the shaft through the shaft opening in the compressor.

Since in the arrangement illustrated in Figs. 1—2, the pressure in the lubricating chamber will be somewhat higher than the pressure in the compressor at the point where the passage 30 connects with the compressor, any vapor or fluid that may leak from the compressor through the shaft opening 24 into the chamber 23 will be returned through the passage 30 to the compressor. In order to reduce to the minimum the foaming or vaporizing of the oil in the lubricating chamber 23 and prevent oil foam from being carried by the other vapor through the passage 30 into the compressor, suitable means are provided for cooling the lubricant so as to maintain it at a suitably low temperature in the lubricating chamber, and means are also preferably provided for separating the oil foam or mist from the vapor which is returned to the compressor. Preferably, for this purpose, a suitable oil circulating system is provided which supplies oil to the bearings and gears or parts to be lubricated, and after lubricating these parts, returns the oil to the pump, the circulating oil being cooled by a cooler located at some suitable point in the oil circuit.

As shown in Figs. 1 to 3, the lower portion of the housing 21 is divided by vertical partitions into oil chambers 35, 36 and 37, the last mentioned leading to the oil circulating pump 38. The chambers 35 and 36 communicate with each other through a valve controlled opening 39 in the dividing partition, adapted to permit oil to pass from the former to the latter chamber. The oil draining from the gears and bearings is caught and directed by a pan or gutter 40 to one end of the chamber 36, and the oil escaping from the inner ends of the bearings into the chamber 35 can pass through the valve controlled opening 39 into the chamber 36. This chamber 36 communicates at its opposite end by an opening 41 with the chamber 37 leading to the pump 38. An oil cooler 42 is shown extending through the opening 41 so that the oil in passing from the chamber 36 to the chamber 37 is forced to pass through the cooler and to be cooled thereby. The oil cooler 42 may be of any suitable construction. For instance, a tubular cooler of known construction is shown comprising headers connected by tubes through which water or other cooling medium is circulated for cooling the oil which flows through the spaces between the tubes.

The oil pump 38, which may be driven by any suitable means, for instance, by suitable gears 43 connecting the compressor drive shaft 18 to the pump shaft 44, delivers the oil through suitable connections, including, for instance, pipes 45 and 46 and branches 47, 48 and 49, to the bearings and to the drive gearing within the enclosure 21.

The housing 21 shown, is provided with an upwardly projecting portion forming a chamber 50 from the upper end of which the return pipe 30 extends for carrying the vapor or fluid back to the compressor, and in this chamber 50 is provided suitable means for separating the vapor or fluid which has leaked from the compressor into the lubricating chamber 23 from the foam or mist of the lubricant. The separator shown comprises a funnel-shaped screen 51 of wire mesh or other suitable material which, at its large, upper end fills the chamber 50, and above this screen, baffle plates 52 of suitable form and arrangement adapted to cause the vapor or gas to follow a circuitous path through the chamber 50 to the pipe 30 leading to the compressor. The oil foam or mist is intercepted by the screen and baffles 51 and 52 and is adapted to drain back from the small end of the funnel through a suitable drain pipe 63, the lower end of which is submerged in the body of oil in one of the chambers in the lower portion of the housing or enclosure 21, for instance, the chamber 37.

Figure 4:
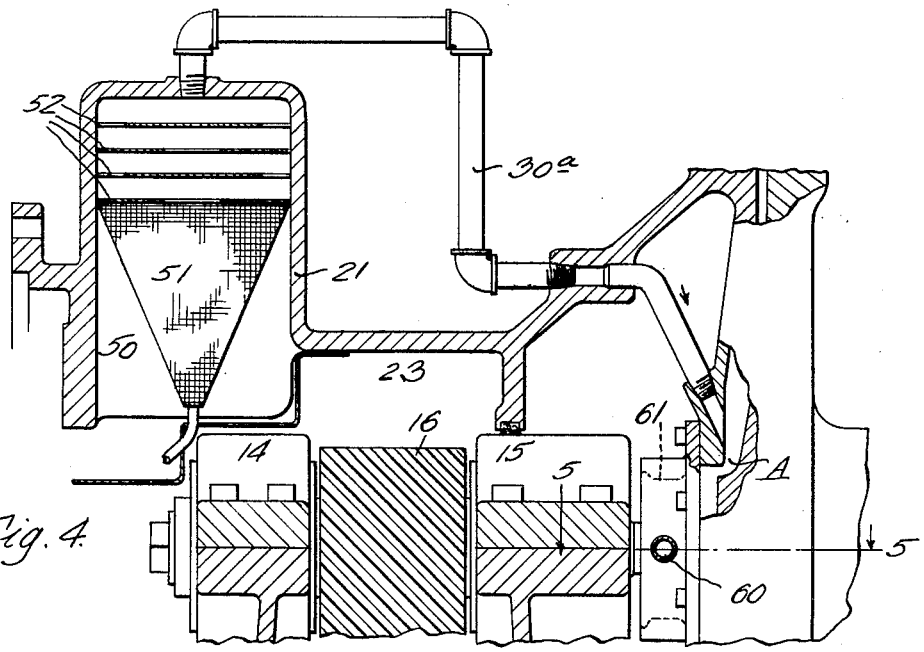
Fig. 4 is a fragmentary, sectional elevation, similar to Fig. 1, showing a slightly modified embodiment of the invention.
Figure 5:
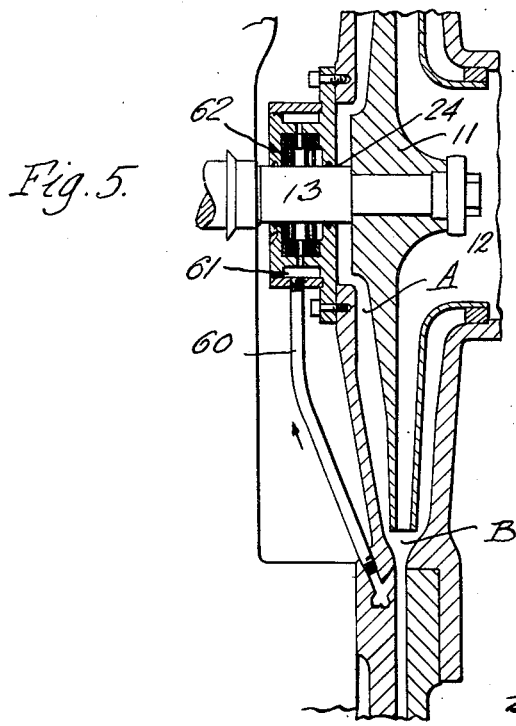
Fig. 5 is a fragmentary, sectional plan thereof on line 5—5, Fig. 4.

The construction shown in Figs. 4 and 5 is similar to that shown in Figs. 1 to 3, and above described, with the exception that in the Figures 4 and 5 construction, the pipe 30a for returning the vapor from the oil and vapor separator to the compressor enters the pressure end of the compressor in the vicinity of the region A with which the shaft opening 24 communicates. The pressure at the compressor end of the pipe 30a, therefore approximates that in the region A at the inner end of the shaft opening, and with this arrangement a higher pressure is maintained in the lubricant chamber 23 than in the construction first described. Because of this higher pressure, a suitable pipe or passage 60 is provided leading from a high pressure region of the interior of the compressor, for instance, from a point near the region B of highest pressure, to a casing 61 in which a labyrinth packing 62 for the shaft opening 24 is provided. The gas from this connection 60 is admitted between the ends of the labyrinth packing or stuffing box so that there is adapted to be a limited flow of gas from the connection 60 through the shaft opening 24 in both directions, or that is both toward the rotor chamber of the compressor and toward the lubricant chamber 23. The flow of this gas toward the lubricant chamber prevents oil from passing through the shaft opening into the compressor.

The second arrangement shown in Figs. 4 and 5 permits a higher range of pressures to be maintained in the lubricant chamber than would occur in the construction shown in Figs. 1–3, but both constructions develop the points of pressure difference necessary to control the direction of flow of leakage gases through the shaft opening. The pressure in the lubricant chamber governs, with the oil temperature, the amount of refrigerant which the oil will absorb. A low pressure would mean less absorption, but, it also means a greater volume of gas to handle on surges so that in an installation requiring a high suction vacuum, one method would be preferable, while the other method would give better results for a low vacuum installation.

I claim as my invention:

1. The combination with a compressor having a shaft, of a chamber which contains a lubricant for the compressor and communicates with the interior of the compressor by a shaft opening through which said shaft extends from the compressor into said chamber, said shaft opening communicating only at one end thereof with said chamber and means for maintaining in said chamber a pressure below that existing in said shaft opening whereby leakage is prevented from said chamber through said shaft opening into the compressor.

2. The combination with a compressor having a shaft, of a chamber which contains a lubricant for the compressor and communicates with the interior of the compressor by a shaft opening through which said shaft extends from the compressor into said chamber, said shaft opening communicating only at one end thereof with said chamber and means operated by the compressor for causing a pressure differential in said chamber and said shaft opening such that leakage is prevented through said shaft opening from said chamber into the compressor.

3. The combination with a compressor having a shaft, of a chamber which communicates with the interior of the compressor by a shaft opening through which said shaft extends from the compressor into said chamber, said chamber containing a lubricant, and means for withdrawing from said chamber and returning to the compressor fluid leaking from the compressor through said shaft opening into said chamber and thereby causing a pressure differential in said chamber and said shaft opening such that leakage is prevented through said shaft opening from said chamber into the compressor.

4. The combination with a compressor having a shaft, of a chamber which communicates with the interior of the compressor by a shaft opening through which said shaft extends from the compressor into said chamber, said chamber containing a lubricant, means for maintaining a pressure in said chamber below that in said shaft opening whereby leakage is prevented through said shaft opening from said chamber into the compressor, and means for separating from the lubricant the fluid leaking from the compressor through said shaft opening into said chamber and returning said fluid to the compressor.

5. The combination with a compressor having a shaft, of a chamber at the pressure end of the compressor which communicates with the interior of the pressure end of the compressor by a shaft opening through which said shaft extends from the compressor into said chamber, said chamber containing a lubricant, and means connecting with said chamber only beyond the end of said shaft opening remote from the compressor for maintaining in said chamber a pressure below that existing in said shaft opening whereby leakage is prevented from said chamber through said shaft opening into the compressor.

6. The combination with a compressor having a shaft, of a chamber which communicates with the interior of the compressor by a shaft opening through which said shaft extends from the compressor into said chamber, said shaft opening communicating only at one end thereof with said chamber and a device within said chamber requiring lubrication, means for supplying lubricant to said device, and means acting to reduce the pressure in said chamber for causing a pressure differential in said chamber and said shaft opening such as to prevent leakage of lubricant through said shaft opening into the compressor.

7. The combination with a compressor having a rotor chamber and a rotor shaft, of a closed chamber which communicates with the high pressure end of said rotor chamber by a shaft opening through which said rotor shaft extends, the only bearing for said shaft being located in said chamber, means for supplying lubricant to said bearing chamber, and means acting to reduce the pressure in said chamber for causing a pressure differential in said chamber and said shaft opening such as to prevent leakage of lubricant through said shaft opening into the rotor chamber.

8. The combination with a compressor having a rotor chamber and a rotor shaft, of a chamber which communicates with the pressure end of said rotor chamber by a shaft opening through which said rotor shaft extends, gearing in said chamber for driving said rotor shaft, means for supplying lubricant to said drive gearing, and means acting to reduce the pressure in said chamber for causing a pressure differential in said chamber and said shaft opening such as to prevent leakage of lubricant through said shaft opening into the rotor chamber.

9. The combination with a compressor having a shaft, of a chamber which communicates with the interior of the compressor by a shaft opening through which said shaft extends from the compressor into said chamber, said chamber containing a lubricant, and a passage connecting said chamber with a low pressure portion of the compressor for maintaining in said chamber a pressure below that existing in said shaft opening whereby leakage is prevented from said chamber through said shaft opening into the compressor, said passage connecting with said chamber only beyond the end of said shaft opening farthest from the interior of the compressor.

10. The combination with a compressor having a shaft, of a chamber which communicates with the interior of the compressor by a shaft opening through which said shaft extends from the compressor into said chamber, said chamber containing a lubricant, a passage connecting said chamber with a low pressure portion of the compressor for maintaining in said chamber a pressure below that existing in said shaft opening whereby leakage is prevented from said chamber through said shaft opening into the compressor, and means interposed between and connecting with said chamber and said passage for separating from the lubricant the fluid leaking from the compressor into said chamber and permitting the return of said fluid to the compressor.

11. The combination with a compressor having a shaft, of a chamber which communicates with the interior of the compressor by a shaft opening through which said shaft extends from the compressor into said chamber, the only parts of said compressor requiring lubrication being located in said chamber, means for circulating a lubricant through said chamber, means for cooling the circulating lubricant, and differential pressure means acting to prevent leakage from said chamber through said shaft opening into the compressor.

12. The combination with a compressor having a shaft, of a chamber which communicates with the interior of the compressor by a shaft opening through which said shaft extends from the compressor into said chamber, the only parts of said compressor requiring lubrication being located in said chamber, means for circulating a lubricant through said chamber, means for cooling the circulating lubricant, differential pressure means acting to prevent leakage from said chamber through said shaft opening into the compressor, and means for returning to the compressor fluid leaking from the compressor through said shaft opening into said chamber.

13. The combination with a compressor having a shaft, of a chamber which communicates with the interior of the compressor by a shaft opening through which said shaft extends from the compressor into said chamber, the only parts of said compressor requiring lubrication being located in said chamber, means for circulating a lubricant through said chamber, means for cooling the circulating lubricant, differential pressure means acting to prevent leakage from said chamber through said shaft opening into the compressor, means for separating from the lubricant fluid leaking from the compressor into said chamber, and a passage connecting said separating means to said compressor for returning the separated fluid to the compressor.

14. The combination with a compressor casing, and a compressor rotor therein, of a chamber which communicates with the interior of said casing by an opening for the passage of a drive member, said rotor and drive member being supported wholly by means located in said chamber, said chamber containing a lubricant, means for cooling said lubricant, and differential pressure means acting to prevent leakage of the lubricant through said opening from said chamber into the interior of the compressor.

15. The combination with a centrifugal compressor comprising a casing and a rotor which rotates freely in said casing, of a chamber which communicates with the interior of said casing by an opening for the passage of a drive member, said rotor and drive member being supported wholly by means located in said chamber, said chamber containing a lubricant, means for cooling said lubricant, means for preventing leakage of the lubricant through said opening from said chamber into the interior of the compressor, and means for separating from the lubricant and returning to the compressor fluid leaking from the compressor into said chamber.

16. The method of lubricating a gaseous fluid compressor and preventing the lubricant from lowering the efficiency of the fluid being compressed, which comprises enclosing all parts of said compressor which require lubrication in a chamber having a restricted communication with the interior of the compressor through which restricted communication the moving element of the compressor is driven, supplying the lubricant to said chamber, and maintaining a pressure in said chamber below that existing in said communication to the interior of the compressor, and thereby preventing leakage of the lubricant through said communication into the compressor.

WILLIS H. CARRIER.